(12) United States Patent
Liu et al.

(10) Patent No.: US 11,040,423 B2
(45) Date of Patent: Jun. 22, 2021

(54) WHEEL ROTATING TRANSFER DEVICE

(71) Applicant: CITIC DICASTAL CO., LTD, Hebei (CN)

(72) Inventors: Weidong Liu, Hebei (CN); Liangjian Yue, Hebei (CN); Guoyuan Xiong, Hebei (CN); Zuo Xu, Hebei (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 113 days.

(21) Appl. No.: 16/574,936

(22) Filed: Sep. 18, 2019

(65) Prior Publication Data

US 2020/0171611 A1 Jun. 4, 2020

(30) Foreign Application Priority Data

Nov. 2, 2018 (CN) .......................... 201811297985.3

(51) Int. Cl.
*B23Q 3/18* (2006.01)

(52) U.S. Cl.
CPC ..................... *B23Q 3/18* (2013.01)

(58) Field of Classification Search
CPC .......... B23Q 3/18; B23Q 3/183; B23Q 3/186; B23Q 3/00; B23Q 3/06; B23Q 3/08; B23Q 3/082; B23Q 7/04; B23Q 7/005; B23Q 7/048; B23Q 7/00; B23Q 7/001; B23Q 7/02; B23Q 7/041; B23Q 7/045; B23Q 7/046; B23Q 7/047; B65G 47/902
USPC ....................................................... 29/281.6
See application file for complete search history.

(56) References Cited

U.S. PATENT DOCUMENTS

| | | | |
|---|---|---|---|
| 10,569,378 B2 * | 2/2020 | Liu | ........................ B24B 9/04 |
| 10,641,621 B1 * | 5/2020 | Liu | ..................... B21D 43/003 |
| 2014/0064903 A1 * | 3/2014 | Starz | ..................... B65G 47/52 |
| | | | 414/751.1 |
| 2017/0144480 A1 * | 5/2017 | Kerwin | .................. B25J 9/0093 |
| 2017/0189998 A1 * | 7/2017 | Luo | ...................... B23K 26/361 |
| 2019/0202021 A1 * | 7/2019 | Liu | .......................... B24B 5/44 |

(Continued)

FOREIGN PATENT DOCUMENTS

| | | | |
|---|---|---|---|
| CN | 204675660 U | * | 9/2015 |
| CN | 105668220 A | * | 6/2016 |
| CN | 106697884 A | * | 5/2017 |

(Continued)

OTHER PUBLICATIONS

STIC Search Report (Year: 2021).*

*Primary Examiner* — Joseph J Hail
*Assistant Examiner* — Michael A Gump
(74) *Attorney, Agent, or Firm* — Cooper Legal Group, LLC

(57) ABSTRACT

A wheel rotating transfer device includes a frame, a lifting cylinder, a flange, guide shafts, linear bearings, a bearing sleeve, a pressure bearing, a spacer ring, a radial bearing, a gear shaft, a bearing end cover, a lifting rack, a first linear guide rail, a precision stroke cylinder, a first guide rail sliding seat, a rack, a carrier, arms, brackets, a plurality of second guide rail sliding seats, a plurality of second linear guide rails, bearing blocks, screw nuts, a bidirectional screw, and a clamping cylinder. The wheel rotating transfer device can meet the requirements of rotating feed of wheels, has the characteristics of simple structure, convenient manufacture, stable performance, high positioning precision and the like, and is particularly suitable for automatic batch production.

1 Claim, 4 Drawing Sheets

(56) References Cited

U.S. PATENT DOCUMENTS

2019/0262952 A1* 8/2019 Liu ................. B23P 19/001
2020/0338756 A1* 10/2020 Zhang ................. B25J 15/08

FOREIGN PATENT DOCUMENTS

CN  108722718 A  * 11/2018
KR  20120092266 A  *  8/2012

* cited by examiner

WHEEL ROTATING TRANSFER DEVICE

CROSS REFERENCE TO RELATED APPLICATION

This application claims priority to Chinese Patent Application No. 201811297985.3, entitled "WHEEL ROTATING TRANSFER DEVICE" and filed on Nov. 2, 2018, which is incorporated herein by reference for all purpose.

FIELD OF THE INVENTION

The present invention relates to a transfer mechanism, and more particularly to a mechanism for implementing wheel transfer through a gear and rack mechanism during wheel circulation.

BACKGROUND OF THE INVENTION

During wheel machining, wheels are circulated between different processes. High-precision positioning of the wheels is also required during the circulation. Generally, each wheel machining enterprise implements wheel circulation by means of manual transportation, which seriously wastes human resources, and has the problems of high labor intensity and low efficiency.

SUMMARY OF THE INVENTION

The present invention is directed to provide a wheel rotating transfer device.

In order to achieve the above objective, the technical solution of the present invention is: a wheel rotating transfer device, comprises: a frame, a lifting cylinder, a flange, guide shafts, linear bearings, a bearing sleeve, a pressure bearing, a spacer ring, a radial bearing, a gear shaft, a bearing end cover, a lifting rack, a first linear guide rail, a precision stroke cylinder, a first guide rail sliding seat, a rack, a carrier, arms, brackets, a plurality of second guide rail sliding seats, a plurality of second linear guide rails, bearing blocks, screw nuts, a bidirectional screw, and a clamping cylinder.

The lifting cylinder is mounted on the frame through the flange; four linear bearings are evenly mounted on the frame; the four guide shafts have one end respectively passing through the four linear bearings and the other ends fixed on the lifting rack; the guide shafts and the linear bearings are in precision small clearance fit; the bearing sleeve is mounted on the lifting rack, and a bottom end of the bearing sleeve is connected with an output shaft of the lifting cylinder. Through the precision small clearance fit between the guide shafts and the linear bearings, the lifting cylinder drives high-precision vertical movement of the lifting rack.

The precision stroke cylinder and the first linear guide rail are mounted on the lifting rack; the rack is connected to the first linear guide rail via the first guide rail sliding seat; the bearing end cover encloses the pressure bearing, the spacer ring and the radial bearing within the bearing sleeve, wherein two ends of the spacer ring are respectively connected with the pressure bearing and the radial bearing; an outer wall of a lower end of the gear shaft is connected with the radial bearing and the pressure bearing, and a top end surface of the gear shaft is fixed on the carrier; grinding teeth are arranged in the middle of the outer wall of the gear shaft and can mesh with the rack. Through the first linear guide rail and the first guide rail sliding seat, the precision stroke cylinder can drive the rack to move linearly along the first linear guide rail. At the same time, through the meshing between the rack and the grinding teeth on the middle outer wall of the gear shaft, the rack drives the gear shaft to rotate. By controlling the stroke of the precision stroke cylinder, the carrier and the gear shaft can rotate at a specific angle with high precision.

The plurality of second linear guide rails are mounted on the carrier; the brackets are connected to the plurality of second linear guide rails via the plurality of second guide rail sliding seats; two ends of and a middle portion of the bidirectional lead screw are mounted on the carrier via three bearing blocks; the two ends of the bidirectional lead screw are provided with bidirectional threads; two brackets are symmetrically mounted on the bidirectional threads at the two ends of the bidirectional lead screw via the two lead screw nuts, and the two lead screw nuts respectively mesh with the bidirectional lead screw; the two arms are respectively mounted on the symmetrical brackets; the clamping cylinder is mounted on the carrier, and its output shaft is connected to the right bracket. Through the plurality of second guide rail sliding seats and the plurality of second linear guide rails, the clamping cylinder drives the right bracket to move along the plurality of second linear guide rails; meanwhile, through the meshing between the bidirectional lead screw and the two lead screw nuts, the two brackets and the two arms synchronously approach or separate with high precision to achieve the functions of clamping and loosening a wheel.

Before actual use, the clamping cylinder controls the two arms in a maximum distance separation state through the meshing between the bidirectional lead screw and the two lead screw nuts. In actual use, through the meshing between the rack and the gear shaft, the precision stroke cylinder controls the arms to rotate directly above a wheel, and the lifting cylinder drives the arms to move down vertically with high precision. Then, the clamping cylinder controls the two arms to synchronously clamp the wheel, and the lifting cylinder drives the arms and the wheel to move up vertically with high precision. Next, the precision stroke cylinder controls the arms to rotate to a position where the wheel is to be transferred, and the lifting cylinder and the clamping cylinder are controlled to place the wheel to the designated position. So far, the rotating transfer of the wheel is completed.

The wheel rotating transfer device can meet the requirements of rotating feed of wheels, has the characteristics of simple structure, convenient manufacture, stable performance, high positioning precision and the like, and is particularly suitable for automatic batch production.

Figure 1:
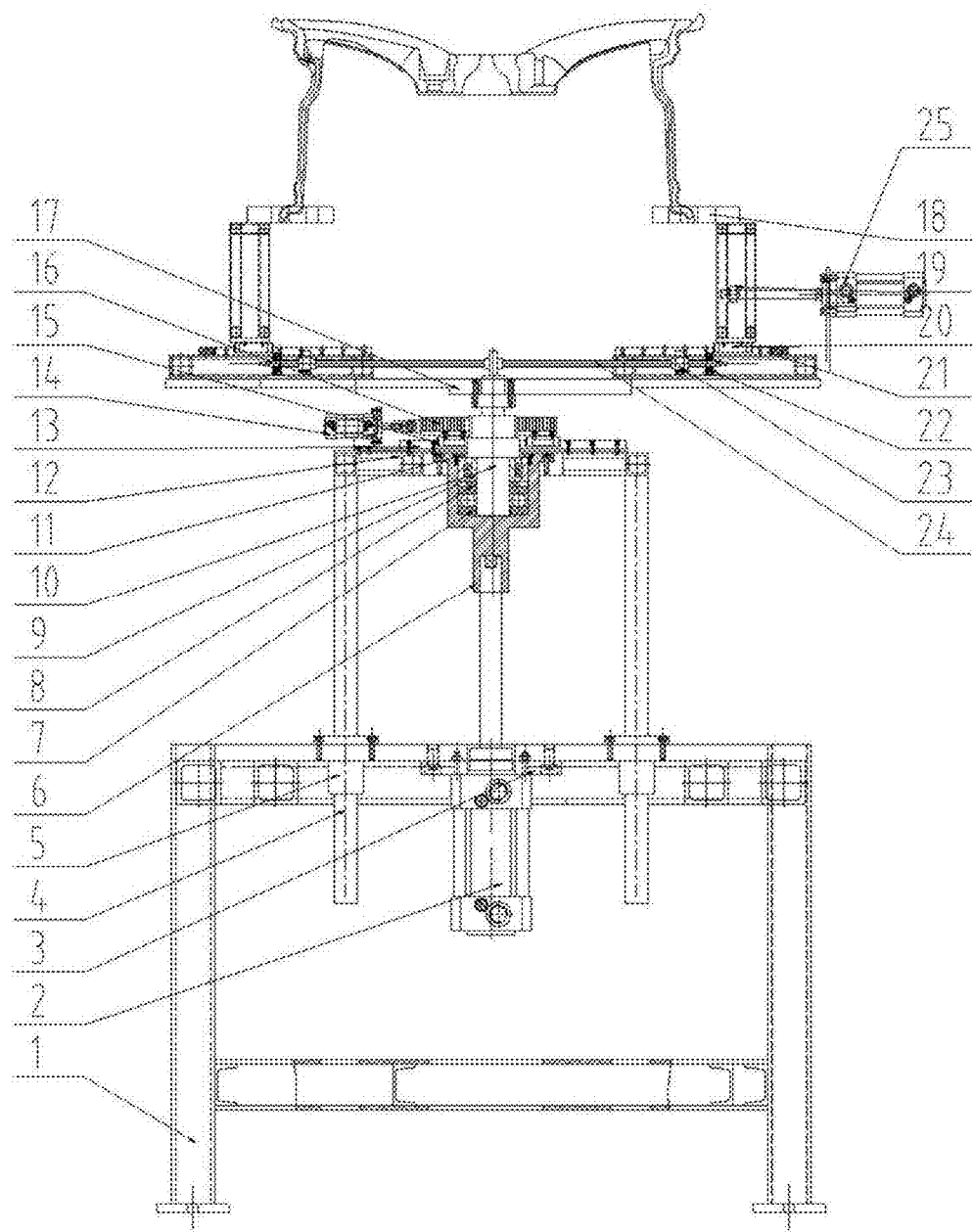
FIG. 1 is a structure diagram of a wheel rotating transfer device according to the present invention.
Figure 2:
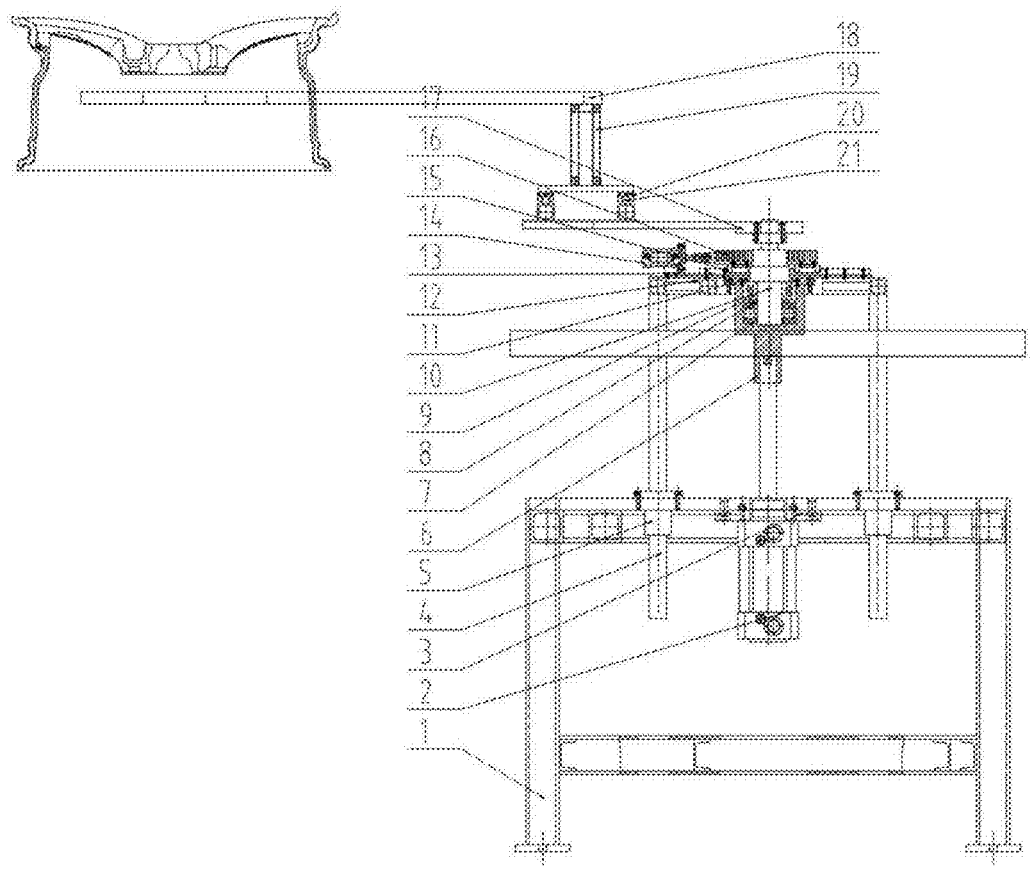
FIG. 2 is a structure diagram of the wheel rotating transfer device during transferring according to the present invention.
Figure 3:
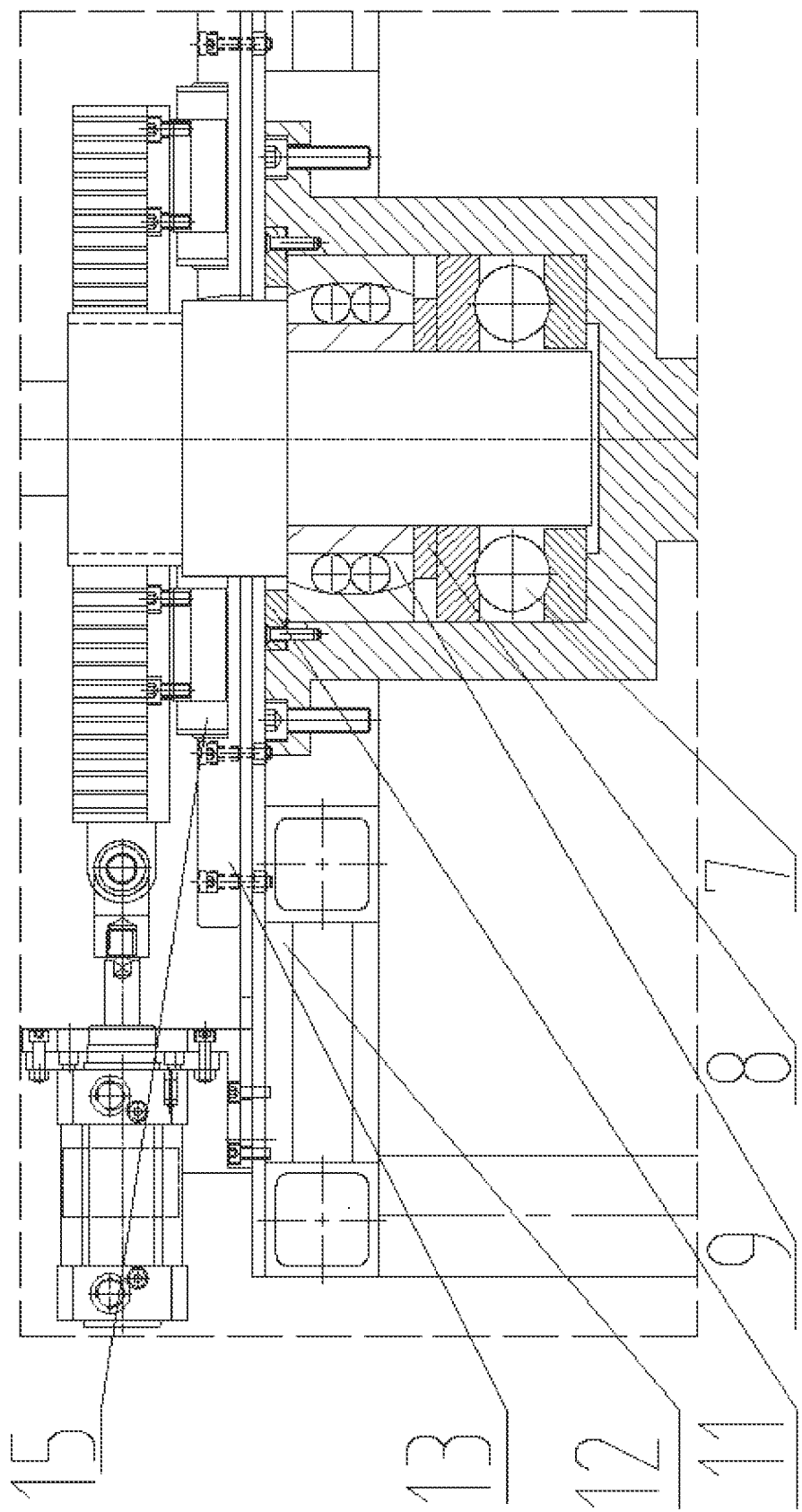
FIG. 3 is a partial enlarged view of the wheel rotating transfer device shown in FIG. 1.
Figure 4:
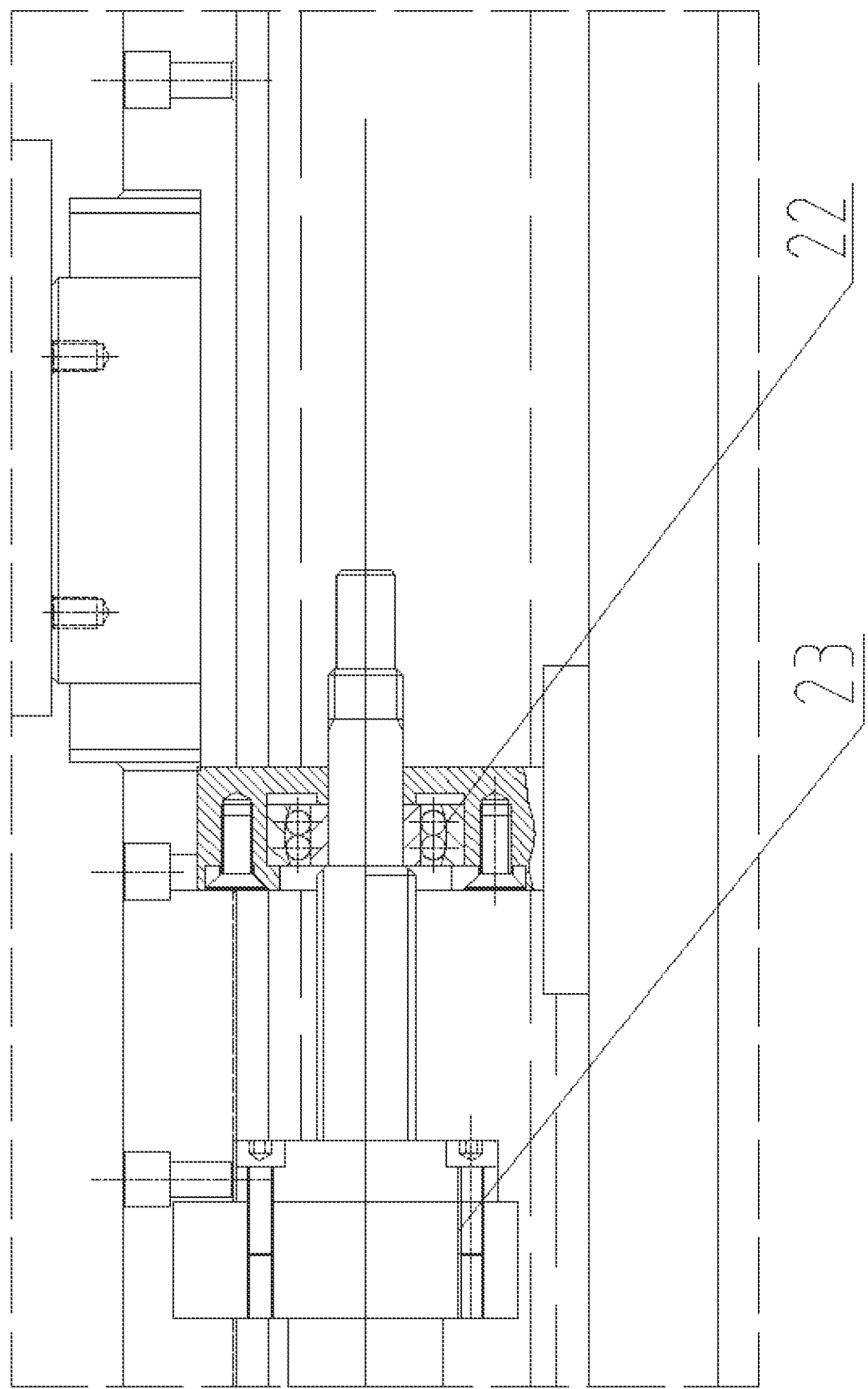
FIG. 4 is another partial enlarged view of the wheel rotating transfer device shown in FIG. 1.

In which, 1—a frame, 2—a lifting cylinder, 3—a flange, 4—guide shafts, 5—linear bearings, 6—a bearing sleeve, 7—a pressure bearing, 8—a spacer ring, 9—a radial bearing, 10—a gear shaft, 11—a bearing end cover, 12—a lifting rack, 13—a first linear guide rail, 14—a precision stroke cylinder, 15—a first guide rail sliding seat, 16—a rack, 17—a carrier, 18—arms, 19—brackets, 20—a plurality of second guide rail sliding seats, 21—a plurality of linear guide rails, 22—bearing blocks, 23—screw nuts, 24—a bidirectional screw, and 25—a clamping cylinder.

DETAILED DESCRIPTION

The details and working conditions of the specific device according to the present invention will be described in detail below in combination with the drawings.

A wheel rotating transfer device according to the present invention comprises: a frame 1, a lifting cylinder 2, a flange 3, guide shafts 4, linear bearings 5, a bearing sleeve 6, a pressure bearing 7, a spacer ring 8, a radial bearing 9, a gear shaft 10, a bearing end cover 11, a lifting rack 12, a first linear guide rail 13, a precision stroke cylinder 14, a first guide rail sliding seat 15, a rack 16, a carrier 17, arms 18, brackets 19, a plurality of second guide rail sliding seats 20, a plurality of second linear guide rails 21, bearing blocks 22, screw nuts 23, a bidirectional screw 24, and a clamping cylinder 25.

The lifting cylinder 2 is mounted on the frame 1 through the flange 3; four linear bearings 5 are evenly mounted on the frame 1; the four guide shafts 4 have one ends respectively passing through the four linear bearings 5 and the other ends fixed on the lifting rack 12; the guide shafts 4 and the linear bearings 5 are in precision small clearance fit; the bearing sleeve 6 is mounted on the lifting rack 12, and a bottom end of the bearing sleeve 6 is connected with an output shaft of the lifting cylinder 2. Through the precision small clearance fit between the guide shafts 4 and the linear bearings 5, the lifting cylinder 2 drives high-precision vertical movement of the lifting rack 12.

The precision stroke cylinder 14 and the first linear guide rail 13 are mounted on the lifting rack 12; the rack 16 is connected to the first linear guide rail 13 via the first guide rail sliding seat 15; the bearing end cover 11 encloses the pressure bearing 7, the spacer ring 8 and the radial bearing 9 within the bearing sleeve 6, wherein two ends of the spacer ring 8 are respectively connected with the pressure bearing 7 and the radial bearing 9; an outer wall of a lower end of the gear shaft 10 is connected with the radial bearing 9 and the pressure bearing 7, and a top end surface of the gear shaft 10 is fixed on the carrier 17; grinding teeth are arranged in the middle of the outer wall of the gear shaft 10 and can mesh with the rack 16. Through the first linear guide rail 13 and the first guide rail sliding seat 15, the precision stroke cylinder 14 can drive the rack 16 to move linearly along the first linear guide rail 13. At the same time, through the meshing between the rack 16 and the grinding teeth on the middle outer wall of the gear shaft 10, the rack 16 drives the gear shaft 10 to rotate. By controlling the stroke of the precision stroke cylinder 14, the carrier 17 and the gear shaft 10 can rotate at a specific angle with high precision.

The plurality of second linear guide rails 21 are mounted on the carrier 17; the brackets 19 are connected to the plurality of second linear guide rails 21 via the plurality of second guide rail sliding seats 20; two ends of and a middle portion of the bidirectional lead screw 24 are mounted on the carrier 17 via three bearing blocks 22; the two ends of the bidirectional lead screw 24 are provided with bidirectional threads; two brackets 19 are symmetrically mounted on the bidirectional threads at the two ends of the bidirectional lead screw 24 via two lead screw nuts 23, and the two lead screw nuts 23 respectively mesh with the bidirectional lead screw 24; two arms 18 are respectively mounted on the symmetrical brackets 19; the clamping cylinder 25 is mounted on the carrier 17, and its output shaft is connected to the right bracket 19. Through the plurality of second guide rail sliding seats 20 and the plurality of second linear guide rails 21, the clamping cylinder 25 drives the right bracket 19 to move along the plurality of second linear guide rails 21; meanwhile, through the meshing between the bidirectional lead screw 24 and the two lead screw nuts 23, the two brackets 19 and the two arms 18 synchronously approach or separate with high precision to achieve the functions of clamping and loosening a wheel.

Before actual use, the clamping cylinder 25 controls the two arms 18 in a maximum distance separation state through the meshing between the bidirectional lead screw 24 and the two lead screw nuts 23. In actual use, through the meshing between the rack 16 and the gear shaft 10, the precision stroke cylinder 14 controls the arms 18 to rotate directly above a wheel, and the lifting cylinder 2 drives the arms 18 to move down vertically with high precision. Then, the clamping cylinder 25 controls the two arms 18 to synchronously clamp the wheel, and the lifting cylinder 2 drives the arms 18 and the wheel to move up vertically with high precision. Next, the precision stroke cylinder 14 controls the arms 18 to rotate to a position where the wheel is to be transferred, and the lifting cylinder 2 and the clamping cylinder 25 are controlled to place the wheel to the designated position. So far, the rotating transfer of the wheel is completed.

The invention claimed is:

1. A wheel rotating transfer device, comprising:
a frame, a lifting cylinder, a flange, guide shafts, linear bearings, a bearing sleeve, a pressure bearing, a spacer ring, a radial bearing, a gear shaft, a bearing end cover, a lifting rack, a first linear guide rail, a precision stroke cylinder, a first guide rail sliding seat, a rack, a carrier, arms, a plurality of brackets, a plurality of second guide rail sliding seats, a plurality of second linear guide rails, bearing blocks, screw nuts, a bidirectional screw, and a clamping cylinder;
wherein the lifting cylinder is mounted on the frame through the flange; four of the linear bearings are evenly mounted on the frame; four of the guide shafts each have one end respectively passing through the four linear bearings and an opposite end fixed on the lifting rack; the guide shafts and the linear bearings are in precision clearance fit; the bearing sleeve is mounted on the lifting rack, and a bottom end of the bearing sleeve is connected with an output shaft of the lifting cylinder; through the precision clearance fit between the guide shafts and the linear bearings, the lifting cylinder drives vertical movement of the lifting rack;
wherein the precision stroke cylinder and the first linear guide rail are mounted on the lifting rack; the rack is connected to the first linear guide rail via the first guide rail sliding seat; the bearing end cover encloses the pressure bearing, the spacer ring and the radial bearing within the bearing sleeve, wherein two ends of the spacer ring are respectively connected with the pressure bearing and the radial bearing; an outer wall of a lower end of the gear shaft is connected with the radial bearing and the pressure bearing, and a top end surface of the gear shaft is fixed on the carrier; grinding teeth are arranged in a middle of the outer wall of the gear shaft and are configured to mesh with the rack; through the first linear guide rail and the first guide rail sliding seat, the precision stroke cylinder can drive the rack to move linearly along the first linear guide rail; at the same time, through the meshing between the rack and the grinding teeth on the middle of the outer wall of the gear shaft, the rack drives the gear shaft to rotate; by controlling the stroke of the precision stroke cylinder, the carrier and the gear shaft are configured to rotate at a specific angle; and wherein the plurality of second linear guide rails are mounted on the carrier; the plurality of brackets are connected to the plurality of second linear guide rails via the plurality of second guide rail sliding seats; two ends of and a middle portion of the bidirectional lead screw are mounted on the carrier via three of the bearing blocks; the two ends of the bidirectional lead screw include bidirectional threads; two brackets of the plurality of brackets are symmetrically mounted on the bidirectional threads at the two ends of the bidirectional lead screw via two of the screw nuts, and the two of the screw nuts respectively mesh with the bidirectional lead screw; two of the arms are respectively mounted on the plurality of brackets; the clamping cylinder is mounted on the carrier, and an output shaft of the clamping cylinder is connected to a right bracket of the two brackets of the plurality of brackets; through the plurality of second guide rail sliding seats and the plurality of second linear guide rails, the clamping cylinder drives the right bracket of the two brackets of the plurality of brackets to move along at least one of the plurality of second linear guide rails; meanwhile, through the meshing between the bidirectional lead screw and the two of the screw nuts, the two brackets of the plurality of brackets and the two arms synchronously at least one of approach or separate to respectively clamp or loosen a wheel.

\* \* \* \* \*